United States Patent
Kenyon et al.

(10) Patent No.: US 9,846,022 B2
(45) Date of Patent: Dec. 19, 2017

(54) WAFER ALIGNMENT DEVICE

(71) Applicant: Dieterich Standard, Inc., Boulder, CO (US)

(72) Inventors: Nathaniel Kirk Kenyon, Boulder, CO (US); Bryce Arthur Bingham, Boulder, CO (US); John Henry Stehle, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 144 days.

(21) Appl. No.: 14/865,057

(22) Filed: Sep. 25, 2015

(65) Prior Publication Data

US 2017/0089685 A1  Mar. 30, 2017

(51) Int. Cl.
 *G01B 5/25* (2006.01)
(52) U.S. Cl.
 CPC ...................... *G01B 5/25* (2013.01)
(58) Field of Classification Search
 CPC ........................................................ G01B 5/25
 USPC .................................. 33/412, 529, 613, 645
 See application file for complete search history.

(56) References Cited

U.S. PATENT DOCUMENTS

| | | | | |
|---|---|---|---|---|
| 3,643,983 A * | 2/1972 | Ludeman | ............... | F16L 23/006 285/31 |
| 4,345,464 A | 8/1982 | Herzl et al. | | |
| 5,222,306 A * | 6/1993 | Neumann | ................ | G01B 5/25 29/272 |
| 5,228,181 A * | 7/1993 | Ingle | ...................... | B25B 27/16 228/44.5 |
| 5,632,632 A * | 5/1997 | Huotari | ................. | G01F 15/185 285/24 |
| 9,255,825 B1 * | 2/2016 | Smith | ..................... | G01F 15/14 |
| 9,464,926 B2 * | 10/2016 | Smith | ..................... | G01F 1/584 |
| 2002/0133960 A1 * | 9/2002 | Cross | ....................... | G01B 5/24 33/412 |
| 2016/0091128 A1 * | 3/2016 | Stehle | ....................... | G01F 1/36 285/412 |

FOREIGN PATENT DOCUMENTS

| | | |
|---|---|---|
| EP | 1186867 A1 | 3/2002 |
| WO | 9610161 A1 | 4/1996 |

OTHER PUBLICATIONS

"Vortex Flowmeter/Swirl Flowmeter FV4000 FS 4000", Operation Instruction, ABB Inc., 2011.
International Search Report and the Written Opinion of the International Searching Authority from PCT/US2016/051853, dated Dec. 22, 2016, 13 pages.

* cited by examiner

*Primary Examiner* — G. Bradley Bennett
(74) *Attorney, Agent, or Firm* — Westman, Champlin & Koehler, P.A.

(57) ABSTRACT

An alignment device for a wafer in an industrial process assembly includes an inner surface shaped to conform to an outer surface of a wafer, an outer surface comprising at least two cams; and two ends connecting the inner surface to the outer surface. The two ends are positioned such that when the alignment device is positioned on the outer surface of the wafer, the alignment device extends more than one hundred eighty degrees around the wafer.

22 Claims, 4 Drawing Sheets

WAFER ALIGNMENT DEVICE

BACKGROUND

The present disclosure relates to process control systems. In particular, the present disclosure relates to wafers and flanges in industrial processes.

In processing plants, fluids are conveyed through piping to various processing elements. The piping includes individual pipe sections that are connected together by fittings. Elements, such as sensors and valves, can be introduced into the piping by placing the elements between the fittings of two pipe sections.

In a common configuration, a wafer is placed between two pipe sections. The wafer includes an outer ring that is positioned annularly about at least one fluid flow passage. One or more holes pass through the outer ring in a radial direction. Sensors may be introduced through the radial holes to interact with the fluid and/or piping may be introduced into the radial holes to direct fluid to a sensor mounted outside of the piping. Further, orifice plates, averaging pitot tubes, other flow obstructions or other components that interact with the process fluid may be positioned within the fluid flow passage of the wafer ring.

Some wafers are installed between process pipes by sandwiching the wafer ring between two flange fittings that are then connected together by nuts and studs or bolts. Flange fittings generally include a collar that is welded to the end of a pipe, a bore that is aligned with the inner bore of the pipe, an annular sealing section that extends around the bore and a flange section that extends around the annular sealing section. The flange section includes a planar face that has several through holes that accept studs for connecting the fitting to another fitting. The annular sealing section has a sealing face designed to mate with and seal against one or more other elements at the fitting junction.

Measurement devices that utilize wafers have a stated accuracy level for the measurements they provide. However, these accuracy levels are only valid if the wafer ring is properly centered relative to the center of the neighboring pipe sections. If the center of the wafer ring is offset from the center of the pipe section by more than a specified off-center allowance, the measurement device will not be able to provide measurements at the stated accuracy.

SUMMARY

An alignment device for a wafer in an industrial process assembly includes an inner surface shaped to conform to an outer surface of a wafer, an outer surface comprising at least two cams; and two ends connecting the inner surface to the outer surface. The two ends are positioned such that when the alignment device is positioned on the outer surface of the wafer, the alignment device extends more than one hundred eighty degrees around the wafer.

In a further embodiment, an industrial process assembly for carrying a process fluid conveyed through process piping includes a wafer and a centering device comprising an inner surface that contacts the wafer. The centering device is stretched outward by the contact between the inner surface and the wafer.

In a still further embodiment, an alignment ring for a wafer positioned between two pipe flanges of a process control system includes a first component comprising an inner surface for contacting the wafer and a cam surface and a second component comprising an inner surface for contacting the wafer and a cam surface. The cam surface of the first component and the cam surface of the second component are positionable so as to exert two separate forces on a stud extending between the two pipe flanges, the two separate forces at least partially opposing each other.

DETAILED DESCRIPTION OF ILLUSTRATIVE EMBODIMENTS

Figure 1:
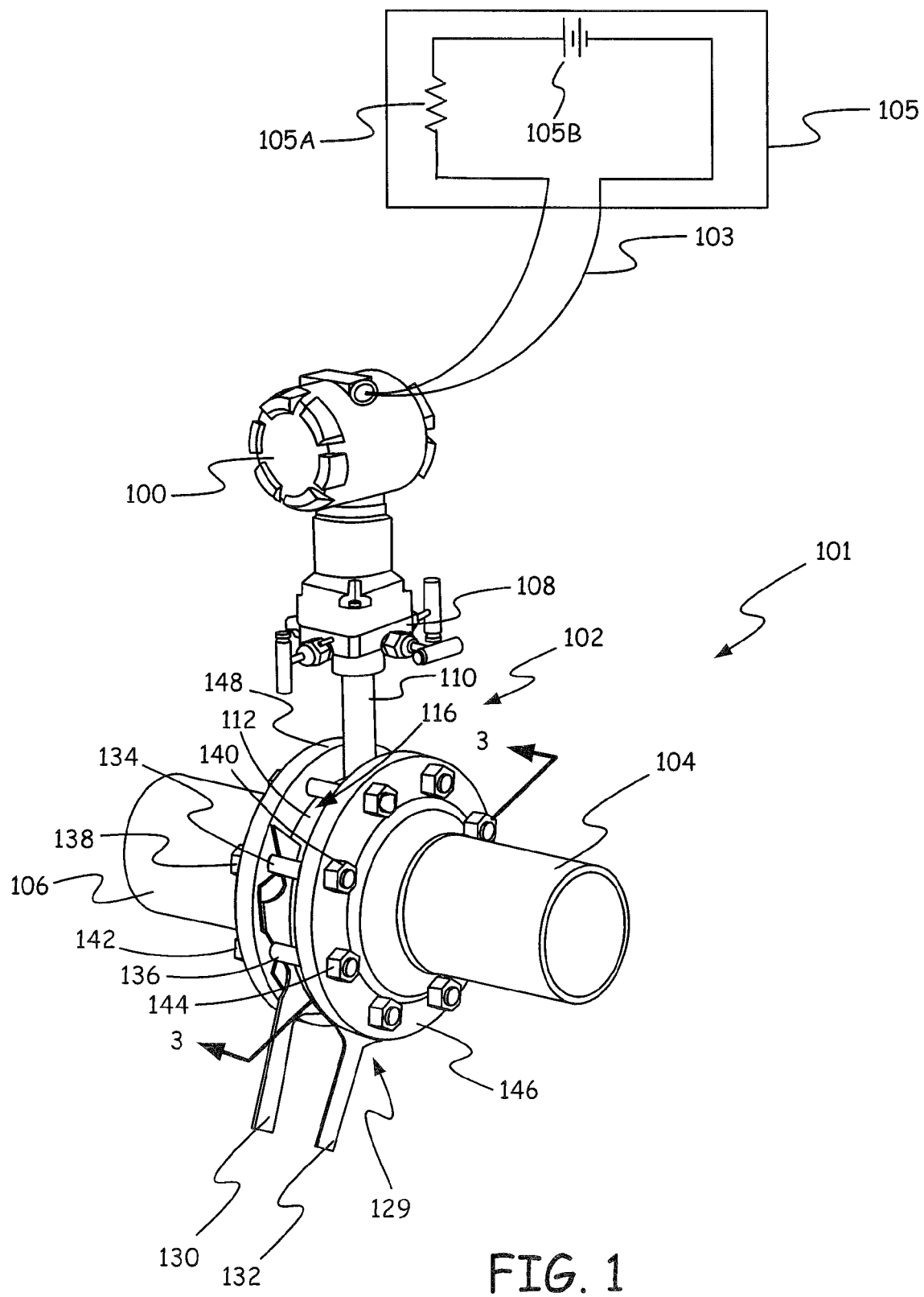
FIG. 1 is a simplified diagram of a portion of an industrial process control system.

FIG. 1 is a perspective view of a portion of a process control system. In FIG. 1, a process assembly 101 is shown positioned between two flange fittings 146 and 148 that are welded to respective ends of two pipe sections 104 and 106 that carry a process fluid. Flange fittings 146 and 148 are held together by a collection of studs or bolts, such as studs 134 and 136, and nuts, such as nuts 138, 140, 142 and 144.

In this embodiment, assembly 101 includes a wafer 102 and an alignment ring or centering device 129. Wafer 102 includes a wafer ring 112 having an inner bore 114 (shown in FIGS. 3 and 4), an outer surface or perimeter 116, a hollow post 110 and a mounting plate 108. One or more conduits in hollow post 110 and wafer ring 112 allow sensors to be positioned at inner bore 114 and/or carry a fluid between inner bore 114 and mounting plate 108 that can be used to determine a process variable for the process fluid. A process variable transmitter 100 is mounted on mounting plate 108 and measures one or more parameters of the process fluid to produce values for one or more process variables.

Process variable transmitter 100 communicates with a control room 105 to provide the one or more process variables to control room 105. Example process variables include pressure, temperature, flow level, pH conductivity, turbidity, density, concentration, chemical composition, etc. Process variable transmitter 100 may communicate with control room 105, illustrated as a resistance 105A and a power supply 105B, using various techniques including both wired and wireless communication. One common wired communication technique uses what is known as a two-wire process control loop 103 in which a single pair of wires is used to carry information as well as provide power to transmitter 100. One technique for transmitting information is by controlling the current level through process control loop 103 between 4 milliamps and 20 milliamps. The value of the current within the 4-20 milliamp range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART® in accordance with IEC 62591, may also be implemented.

To ensure that the process variable measured by process variable transmitter 100 is accurate, inner bore 114 of wafer ring 112 must be centered relative to the center of pipe sections 104 and 106. In accordance with the various embodiments, wafer ring 112 is centered using centering or alignment device 129, which is constructed from two alignment components 130 and 132 in some embodiments. In other embodiments, alignment device 129 is constructed from one of alignment components 130 and 132. Alignment components 130 and 132 are placed around outer surface 116 of wafer ring 112 and engage a plurality of studs, such as studs 134 and 136, to center or align the center of wafer ring 112 with the center of pipe sections 104 and 106. Alignment components 130 and 132 are each partial rings that extend angularly more than 180 degrees but less than 360 degrees around wafer 102. When placed about outer surface 116, each partial ring is stretched outward so that an inner surface of each alignment component engages outer surface 116 and such that the alignment components 130 and 132 are prevented from moving in a radial direction relative to outer surface 116.

Figure 2:
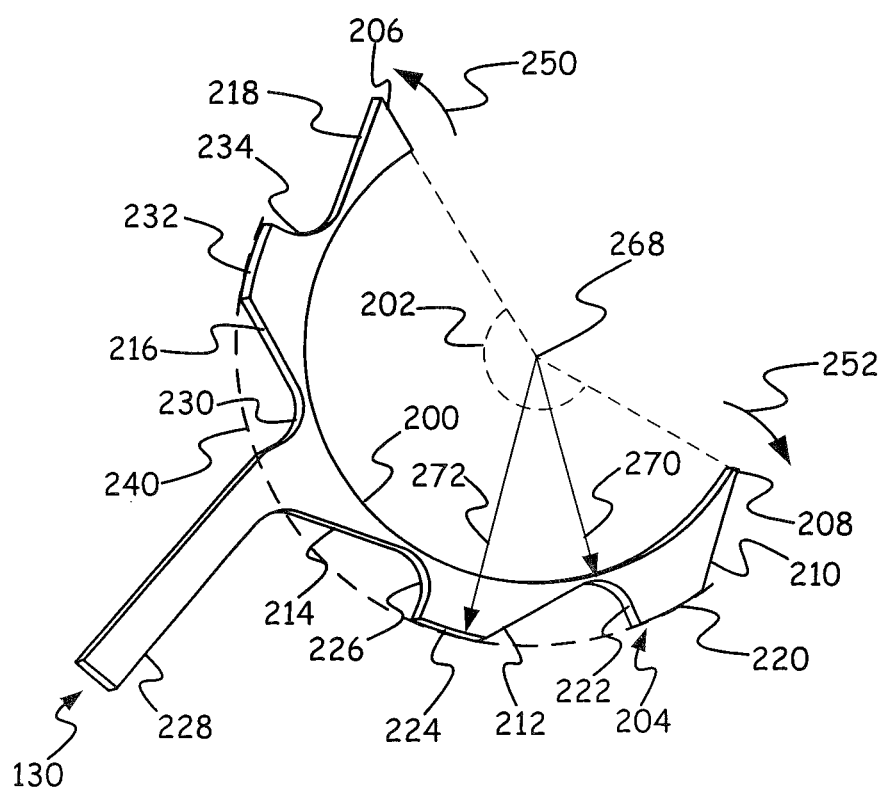
FIG. 2 is a perspective view of an alignment component.

FIG. 2 provides a perspective view of alignment or centering component 130. In most embodiments, alignment or centering component 132 is identical to alignment component 130 but is flipped relative to alignment component 130 when installed on wafer 102 as discussed further below.

As shown in FIG. 2, alignment component 130 is a partial annular ring that has an inner surface 200, an outer surface 204, and two ends 206 and 208 connecting inner surface 200 to outer surface 204. Ends 206 and 208 are positioned such that inner surface 204 spans an angle 202 that is greater than 180 degrees. In FIG. 2, inner surface 200 is circular. In other embodiments, inner surface 200 can have other shapes as long as inner surface 200 is shaped to conform to at least a portion of the shape of outer surface 116 of wafer ring 112.

In this embodiment, outer surface 204 includes cam surfaces or cams 210, 212, 214, 216 and 218. Each cam surface or simply cam is angled relative to inner surface 200. Cam 210 is separated from cam 212 by arc surface 220 and recess surface 222 of outer surface 204. Cam 212 is separated from cam 214 by arc surface 224 and recess surface 226. Cam 214 is separated from cam 216 by a handle 228 and a recess surface 230 of outer surface 204. Cam 216 is separated from cam 218 by an arc surface 232 and a recess surface 234. In accordance with some embodiments, recess surfaces 222, 226, and 234 have a linear portion extending inward from a respective arc surface and a curved portion extending from the linear portion to a respective cam surface. In such embodiments, recess 230 has a linear portion extending inward from handle 228 and a curved portion extending from the linear portion to cam surface 216. Handle 228 extends outward beyond a circular boundary, shown as dotted line 240, that arc surfaces 220, 224 and 232 lie along in accordance with some embodiments. The distance 270 from the center 268 of inner surface 200 to the innermost part of recess surfaces 222, 226, 230 and 234 is set based on the smallest bolt circle on a given flange size while distance 272 from center 268 to circular boundary 240 of arc surfaces 220, 224 and 232 is set based on the largest bolt circle on a given flange size, where the bolt circle is a circle that includes the centers of each bolt hole in the flange.

In accordance with some embodiments, the portions of inner surface 200 that are to contact outer surface 116 have a nominal inner diameter that exactly matches the nominal outer diameter of outer surface 116 or have a nominal inner diameter that is smaller than the nominal outer diameter of outer surface 116. This is different from prior alignment devices where the nominal inner diameter of the inner surface 200 is defined as being larger than the nominal outer diameter of outer surface 116 to ensure that even with manufacturing variations, the wafer will fit within the alignment device. Having the inner diameter of the alignment device larger than the outer diameter of the wafer is undesirable because it creates a space between the alignment device and the wafer such that the wafer tends to fall to the bottom of the inner surface of the alignment device during centering instead of being positioned at the center of the alignment device. Thus, the extra space between the alignment device and the wafer produces alignment errors that can cause the final alignment to be outside of acceptable tolerances.

By defining the nominal inner diameter of the alignment component as being the same or smaller than the nominal outer diameter of the wafer, embodiments herein reduce or remove the alignment error caused by spaces between the alignment component and the wafer. However, when the nominal inner diameter of the alignment component is defined as being the same as the nominal outer diameter of the wafer, manufacturing variances in the alignment component, the wafer, or both, can result in an alignment component that has an inner diameter that is actually smaller than the outer diameter of the wafer. Alignment component 130 tolerates such manufacturing variations because it can be stretched or expanded by contact with outer surface 116 of wafer 102 through the movement of ends 206 and 208 outward in directions 250 and 252. Since alignment component 130 is capable of being stretched or expanded, it is less likely that a space will exist between wafer 102 and alignment component 130. By eliminating this space, alignment component 130 is able to better align wafer 102 with the center of pipe sections 104 and 106.

Figure 3:
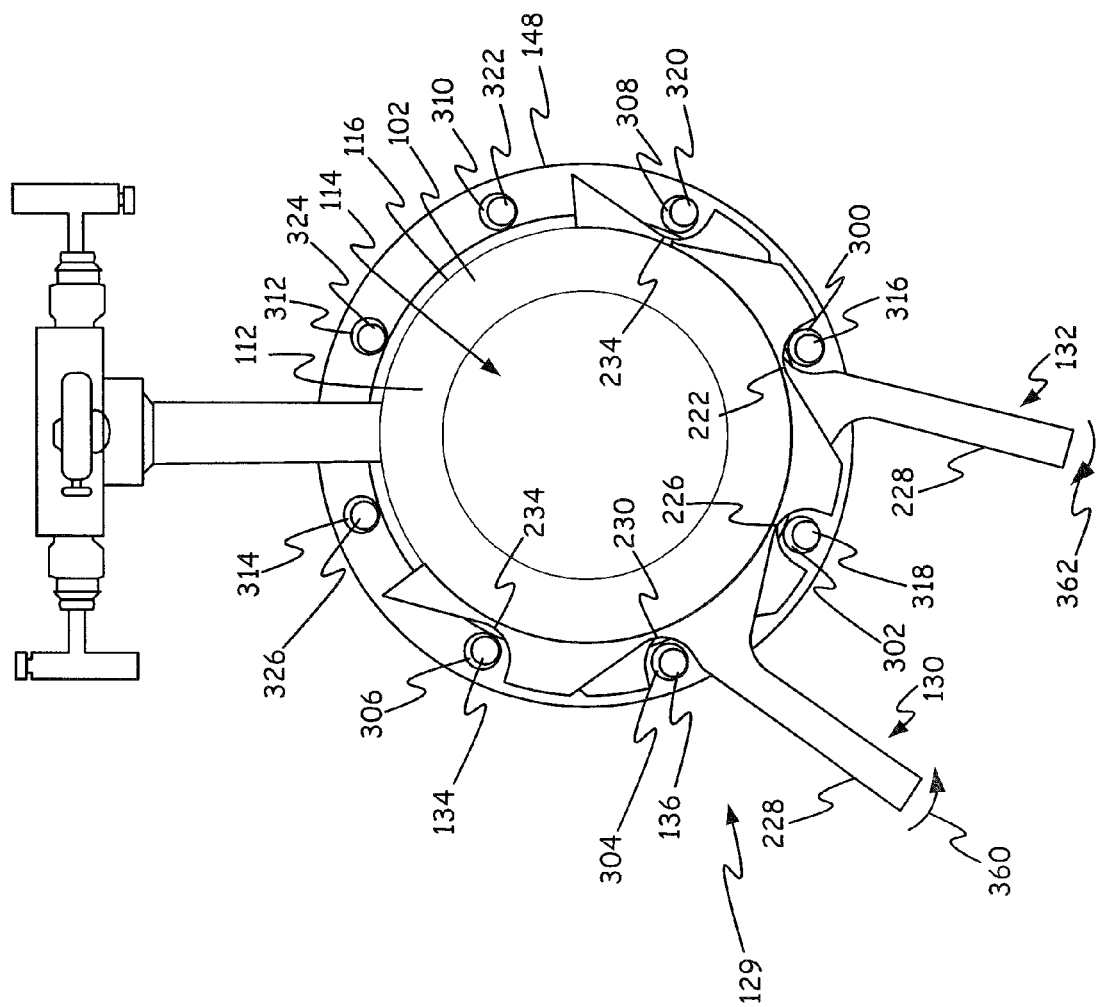
FIG. 3 is a sectional view of a portion of the process control system of FIG. 1 with alignment components in a relaxed state.

FIG. 3 provides a view of the assembly of FIG. 1 taken through line 3 of FIG. 1 with process variable transmitter 100 removed. In FIG. 3, alignment components 130 and 132 are in a resting position in which, as shown in FIG. 3, components 130 and 132 are positioned around outer surface 116 of wafer 102 but are not contacting any studs or bolts. In many embodiments, both alignment components 130 and 132 have been stretched or expanded to fit around outer surface 116. Alignment component 130 overlaps alignment component 132, which is flipped relative to alignment component 130 such that cam surfaces for component 130 face in a different direction from and overlap cam surfaces of component 132. Alignment components 130 and 132 each extend around more than half or 180 degrees of outer surface 116 of wafer 102.

In the relaxed position of FIG. 3, the recess surfaces of alignment components 130 and 132 such as recess surfaces 222, 226, 230 and 234 of alignment component 130 and recess surface 234 of alignment component 132 are aligned with respective stud or bolt holes 300, 302, 304, 306 and 308 in flange 148. Holes 310, 312 and 314 of flange 148 are not aligned with any portion of alignment component 130 or alignment component 132. In some embodiments, to adequately center the wafer, alignment device 129 must interact with more than half the number of bolts or studs on the flange. In the relaxed state, studs or bolts in the openings in flange 148 are allowed to drop to the bottoms of the openings. Thus, studs 316, 318, 136, 134, 326, 324, 322 and 320 are shown resting at the bottom of their respective openings.

Figure 4:
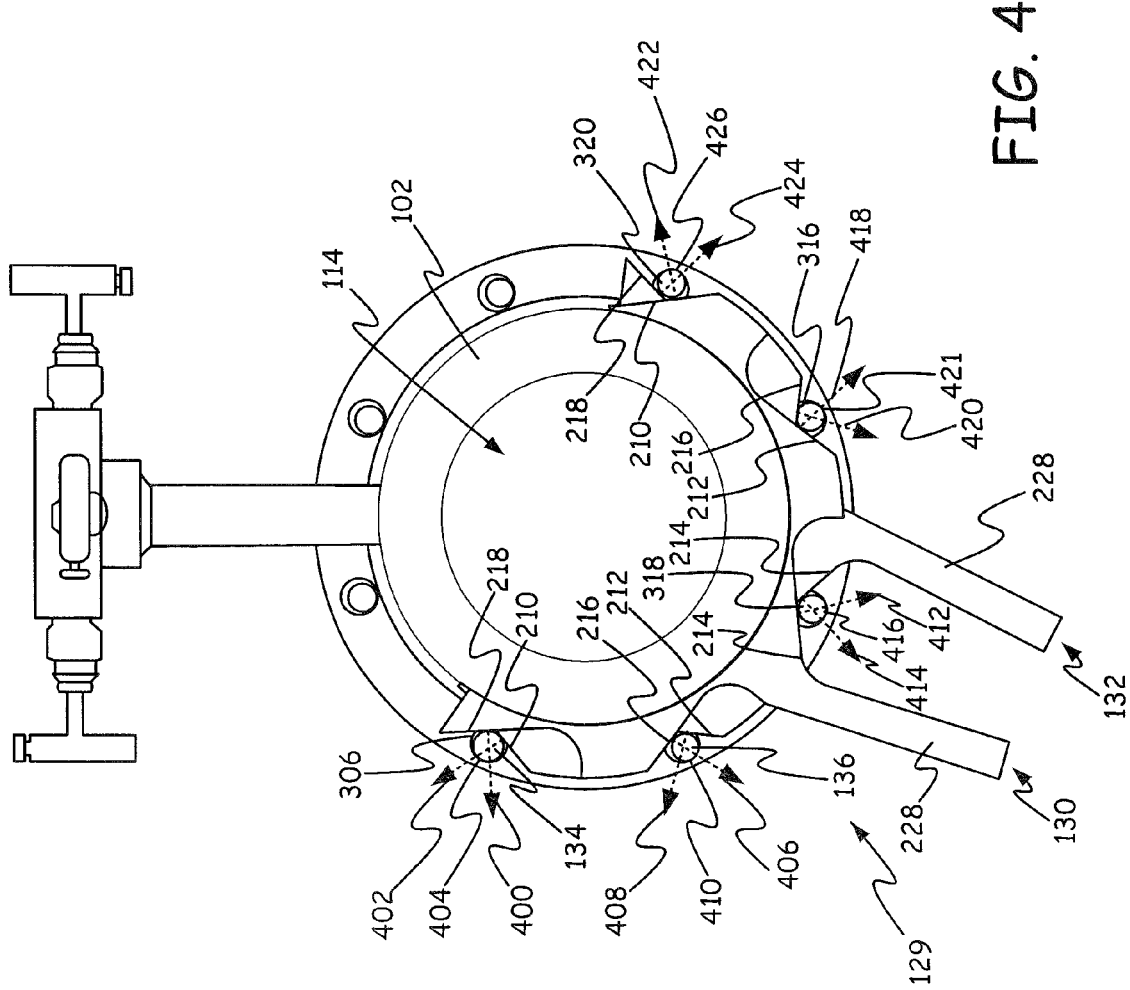
FIG. 4 is a sectional view of a portion of the process control system of FIG. 1 with alignment components in an active state.

Alignment components 130 and 132 can be changed from the resting state of FIG. 3 to an active state shown in FIG. 4 by moving handles 228 toward each other in directions 360 and 362. As handles 228 are moved, cam surfaces on each of alignment components 130 and 132 contact bolts or studs and push the bolts or studs radially outward while shifting wafer 102 toward its centered position.

For example, cam surface 218 of alignment component 130 and cam surface 210 of alignment component 132 contact stud 134 and provide forces on stud 134 in directions 400 and 402, respectively, such that the forces partially counteract or oppose each other to result in a net radially outward force on stud 134. This radially outward force positions stud 134 at a radially outward position 404. Similarly, cam surface 216 of alignment component 130 and cam surface 212 of alignment component 132 provide forces in directions 406 and 408, respectively such that the forces partially counteract or oppose each other to result in a net radially outward force on stud 136 that positions stud 136 at radially outward position 410. Cam surfaces 214 of alignment components 130 and 132 apply forces in directions 412 and 414, respectively, such that the forces at least partially counteract or oppose each other resulting in a net radially outward force that pushes stud 318 outward to a radial outward position 416. Cam surface 212 of alignment component 130 and cam surface 216 of alignment component 132 provide forces in directions 418 and 420, respectively, such that the forces partially counteract or oppose each other resulting in a net radially outward force that positions stud 316 at a radially outward position 421. Cam surface 210 of alignment component 130 and cam surface 218 of alignment component 132 apply forces in directions 422 and 424, respectively, such that the forces partially counteract or oppose each other resulting in a net radially outward force that causes stud 320 to move to a radially outward position 426.

As alignment components 130 and 132 are moved in directions 360 and 362, inner surface 200 of each of alignment component 130 and 132 slides along outer surface 116 of wafer 102 such that the wafer does not rotate. Having alignment components 130 and 132 move in opposite directions helps to prevent rotation of wafer 102. In addition, as alignment components 130 and 132 are moved in directions 360 and 362, the position of wafer 102 is altered so that the center of wafer ring 112 moves toward the center of pipe sections 104 and 106.

Handles 228 of alignment components 130 and 132 are brought together until the studs reach their radial outward position at which point it is no longer possible to bring handles 228 of alignment components 130 and 132 closer together. At this point, the center of wafer ring 112 is centered in the openings of pipe sections 104 and 106.

When installing wafer 102 between flanges 146 and 148, the nuts are loosely threaded onto the studs while alignment components 130 and 132 are in the relaxed state of FIG. 3. Handles 228 of alignment components 130 and 132 are then brought together to place centering device 129 in the active state of FIG. 4. When handles 228 of alignment components 130 and 132 can be brought no closer together, the nuts on the studs are tightened to fix their position and to fix the position of wafer 102 between flanges 146 and 148.

Although two alignment components are used in FIGS. 3 and 4, in other embodiments, a single alignment component may be used as alignment ring 129 to align the wafer. When alignment component 130 is used alone, it is moved from its relaxed state shown in FIG. 3 to its active state shown in FIG. 4 by moving the handle 228 in direction 360. When component 132 is used alone, it is changed from its relaxed state shown in FIG. 3 to its active state shown in FIG. 4 by moving handle 228 in direction 362. Although a single alignment component can be used, having two alignment components provides advantages such as providing more contact points on the bolts or studs, providing more contact area between the alignment device and the wafer, and allowing a technician to "squeeze" handles 228 of the two alignment components together with one hand while tightening the nuts on the flange studs with the other hand.

Traditional alignment rings are not able to center the wafer perfectly if any of the following dimensions are outside of their tolerance range: the alignment device inner diameter, the wafer outer diameter, the stud circle diameter (the circle that the centers of the stud holes lie along), stud hole diameters, and stud diameters. In fact, traditional alignment rings may not be able to center a wafer properly despite all of the above dimensions being within tolerance if the variances from the nominal measure of each dimension coincide or stack up. This is especially true of small line sizes where the allowable offset in the center of the wafer becomes smaller but the tolerances for the above dimensions remain the same. The alignment components 130 and 132 and the alignment device 129 describe above, account for the tolerances in the dimensions listed above and should theoretically center the wafer perfectly despite the dimensions being within tolerances but outside of their nominal values.

The alignment components 130 and 132 can be sized for different line sizes and wafers. A single alignment component or alignment device can be used for multiple ANSI pressure classes and multiple DIN pressure classes.

Although alignment components 130 and 132 are described above as being separate independent components, in other embodiments, the two components are connected to each other through links or pins and/or a ratcheting or vise-grip mechanism that would hold the handles together. Further, although the entirety of inner surface 200 of alignment components 130 and 132 are described as contacting outer surface 116 of the wafer, in other embodiments, inner surface 200 can include tabs such that only the tabs make contact with outer surface 116 while the remaining portions of inner surface 200 are not in contact with outer surface 116.

The shape and position of the handles along alignment components 130 and 132 can be altered as desired. In addition, although a continuous sequence of studs are contacted by the alignment components in FIGS. 3 and 4, in other embodiments, one or more of the cam surfaces may be removed from the alignment ring such that every other stud is contacted by alignment components 130 and 132. In addition, in other embodiments, the alignment components 130 and 132 are extended to include additional cam surfaces that contact additional studs.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:
1. An alignment device for a wafer in an industrial process assembly for carrying a process fluid conveyed through process piping, the alignment device comprising:

an inner surface shaped to conform to an outer surface of a wafer;

an outer surface comprising at least two cams; and two ends connecting the inner surface to the outer surface, the two ends positioned such that when the alignment device is positioned on the outer surface of the wafer, the alignment device forms a partial ring that extends more than one hundred eighty degrees around the wafer.

2. The alignment device of claim 1 further comprising a handle.

3. The alignment device of claim 1 wherein the inner surface, the outer surface and the two ends form a first component and the alignment device further comprises a second component comprising:

a second inner surface to conform to the outer surface of the wafer;

a second outer surface comprising at least one cam; and a second pair of ends connecting the second inner surface to the second outer surface.

4. The alignment device of claim 3 wherein the first component overlaps the second component.

5. The alignment device of claim 4 wherein one cam of the first component overlaps one cam of the second component.

6. The alignment device of claim 5 wherein the one cam of the first component overlaps the one cam of the second component such that the one cam of the first component faces a different direction than the one cam of the second component faces.

7. The alignment device of claim 6 wherein the second pair of ends are positioned such that when the alignment device is positioned on the outer surface of the wafer, the second component device extends more than one hundred eighty degrees around the wafer.

8. The alignment device of claim 6 wherein the second component has a handle.

9. The alignment device of claim 3 wherein a cam of the first component and a cam of the second component are positionable relative to a stud extending between two pipe flanges such that at least a portion of a force applied to the stud by the cam of the first component is counteracted by a force applied to the stud by the cam of the second component.

10. The alignment device of claim 9 wherein the first component and the second component each further comprise a handle and wherein when the handle of the first component is brought toward the handle of the second component, the cam of the first component and the cam of the second component apply force to the stud.

11. An industrial process assembly for carrying a process fluid conveyed through process piping, the assembly comprising:

a wafer; and a centering device comprising an inner surface that contacts the wafer, wherein the centering device is expanded outward by the contact between the inner surface and the wafer.

12. The assembly of claim 11 wherein the centering device further comprises an outer surface with at least two cams.

13. The assembly of claim 12 wherein the centering device further comprises a handle.

14. The assembly of claim 12 wherein the inner surface and the outer surface form part of a first component and the centering device further comprises a second component having an inner surface in contact with the wafer and an outer surface with at least one cam.

15. The assembly of claim 14 wherein a cam of the first component and a cam of the second component are positionable relative to a stud extending between two pipe flanges such that at least a portion of a force applied to the stud by the cam of the first component is counteracted by a force applied to the stud by the cam of the second component.

16. The assembly of claim 15 wherein the first component and the second component each further comprise a handle and wherein when the handle of the first component is brought toward the handle of the second component, the cam of the first component and the cam of the second component apply force to the stud.

17. The assembly of claim 12 wherein the first component extends around more than half of an outer perimeter of the wafer and the second component extends around more than half of the outer perimeter of the wafer.

18. The assembly of claim 11 wherein the centering device extends around more than half of an outer perimeter of the wafer.

19. An alignment ring for a wafer positioned between two pipe flanges of a process control system, the alignment ring comprising:

a first component comprising an inner surface for contacting the wafer and a cam surface wherein the first component extends around less than all of the wafer; and a second component comprising an inner surface for contacting the wafer and a cam surface;

wherein the cam surface of the first component and the cam surface of the second component are positionable so as to exert two separate forces on a stud extending between the two pipe flanges, the two separate forces at least partially opposing each other.

20. The alignment ring of claim 19 wherein the first component and the second component each comprise handles such that when the handles are moved toward each other, the cam surface of the first component and the cam surface of the second component exert force on the stud.

21. The alignment ring of claim 19 wherein the first component extends around more than half of the wafer but less than all of the wafer.

22. The alignment ring of claim 21 wherein the first component is stretched by the wafer when the inner surface of the first component contacts the wafer.

* * * * *